(12) United States Patent
Porfida Ferreira et al.

(10) Patent No.: US 11,647,056 B1
(45) Date of Patent: May 9, 2023

(54) HYBRID VIDEOCONFERENCING ARCHITECTURE FOR TELEMEDICINE

(71) Applicant: Amazon Technologies, Inc, Seattle, WA (US)

(72) Inventors: Francisco Antonio Lunalvo Porfida Ferreira, Everett, WA (US); Brandon Frederick Cadotte, Seattle, WA (US); Rizwan Nazeer Ahamed Mohamed, Bellevue, WA (US); Severine Therese Pinto Rodrigues, Bellevue, WA (US); Trevor Gruby, Issaquah, WA (US); Alexander Davidson, Seattle, WA (US); Mohit Bhalla, Seattle, WA (US); David Michael Rawlins Novicki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 59 days.

(21) Appl. No.: 17/342,259

(22) Filed: Jun. 8, 2021

Related U.S. Application Data

(63) Continuation of application No. 16/452,330, filed on Jun. 25, 2019, now Pat. No. 11,038,933.

(51) Int. Cl.
*H04L 12/16* (2006.01)
*H04L 65/1069* (2022.01)
(Continued)

(52) U.S. Cl.
CPC ...... *H04L 65/1069* (2013.01); *H04L 65/4053* (2013.01); *H04L 67/104* (2013.01)

(58) Field of Classification Search
CPC ............. H04L 65/1069; H04L 65/4053; H04L 67/104; H04L 29/06027; H04M 3/56; H04M 3/561; H04M 7/006; H04M 3/567
See application file for complete search history.

(56) References Cited

U.S. PATENT DOCUMENTS

| 8,321,584 | B2* | 11/2012 | Dobbins | ............... H04L 67/104 709/206 |
| 9,674,240 | B2* | 6/2017 | Vuong | ................ H04L 61/5007 |

(Continued)

FOREIGN PATENT DOCUMENTS

| CN | 102111411 A | * | 6/2011 | ............... H04L 9/30 |

OTHER PUBLICATIONS

Non-Final Office Action, U.S. Appl. No. 16/452,323, dated Feb. 10, 2021, 19 pages.
(Continued)

*Primary Examiner* — Phuongchau Ba Nguyen
(74) *Attorney, Agent, or Firm* — Nicholson De Vos Webster & Elliott LLP

(57) ABSTRACT

Techniques for hybrid videoconferencing are described. A method of hybrid videoconferencing may comprise receiving, by a call routing service, a request to initiate a call with a provider from a user device, providing, by the call routing service, first endpoint data associated with a first connection between the user device and an agent device associated with the provider, establishing the first connection between the agent device and the user device via the call routing service, providing, by the call routing service, second endpoint data associated with a second connection between the user device and the agent device, and establishing, by a peer-to-peer (P2P) contact service, the second connection between the agent device and the user device.

20 Claims, 15 Drawing Sheets

(51) Int. Cl.
*H04L 67/104* (2022.01)
*H04L 65/4053* (2022.01)

(56) References Cited

U.S. PATENT DOCUMENTS

| | | | |
|---|---|---|---|
| 10,255,488 B1 | | 4/2019 | Shaburov et al. |
| 11,038,933 B1 | * | 6/2021 | Profida Ferreira ............................ H04L 65/1093 |
| 11,194,995 B1 | * | 12/2021 | Profida Ferreira .. G06V 40/169 |
| 2005/0174937 A1 | * | 8/2005 | Scoggins .............. H04M 7/006 370/230 |
| 2013/0050395 A1 | | 2/2013 | Paoletti et al. |
| 2018/0337886 A1 | | 11/2018 | Walter |
| 2019/0116154 A1 | | 4/2019 | Auge et al. |

OTHER PUBLICATIONS

Non-Final Office Action, U.S. Appl. No. 16/452,330, dated Aug. 6, 2020, 12 pages.
Notice of Allowance, U.S. Appl. No. 16/452,323, dated Aug. 9, 2021, 8 pages.
Notice of Allowance, U.S. Appl. No. 16/452,330, dated Feb. 19, 2021, 10 pages.
Penaloza, Christian, "Face Tracking with Pan-Tilt Camera (Arduino controlled)," posted Jul. 5, 2012, downloaded from https://www.youtube.com/watch?reload=9&v=rBiEUuuNTDo.
Sljhamul, "Arduino Face Tracking Halloween Prop," posted Aug. 25, 2011, downloaded from https://www.youtube.com/watch?v=zz8h7tc8aLU.
Sparkfun Electronics, "Face Tracking with a Pan/Tilt Servo Bracket," posted Jul. 15, 2011, downloaded from https://www.sparkfun.com/tutorials/304.

* cited by examiner

HYBRID VIDEOCONFERENCING ARCHITECTURE FOR TELEMEDICINE

CROSS-REFERENCE TO RELATED APPLICATIONS

This application is a continuation of U.S. patent application Ser. No. 16/452,330, filed Jun. 25, 2019, which is hereby incorporated by reference in its entirety.

BACKGROUND

Telemedicine systems enable doctors, nurses and other healthcare providers to interact with patients who are not physically present, via phone, videoconference, or other means. This has become a more accessible option as increasing numbers of people carry video chat enabled smartphones, web cam-equipped personal computers, etc. Any distractions between the provider and the patient during the call can lead to a poor call experience as well as misdiagnoses and misunderstandings. As such, video and audio quality are important in such interactions to ensure clear communications between the health care provider and the patient. Existing call platforms may be based on virtualization technologies for commodity hardware. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. While such systems are useful for quickly making providers available to handle incoming call requests, the added network hops can reduce overall performance, leading to call degradation. Additionally, user devices add their own limitations to telemedicine systems, such as limited fields of view, small screens, low bandwidth/high latency connections, etc., which may also contribute to lower quality calls and poor user experiences.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for hybrid teleconferencing are described. According to some embodiments, a hybrid videoconferencing service decouples call routing from media streaming This enables different service requirements to be applied to each connection. For example, the call routing connection may be associated with lower bandwidth and lower security requirements when compared to the media streaming connection. This further enables the use of specialized services that are optimized for each task, for example a call distribution service can manage call routing, call metric collection, transcription, etc., while a peer-to-peer (P2P) media service can manage high quality media streaming Additionally, by establishing P2P connections between users and providers, the content shared on the P2P connection is more secure, without the risk of an intermediary service or other entity being attacked or compromised. Embodiments provide a hybrid videoconferencing infrastructure that enables a high quality, real-time conversation to be conducted between patients and providers over a wider range of real world operating environments.

Figure 1:
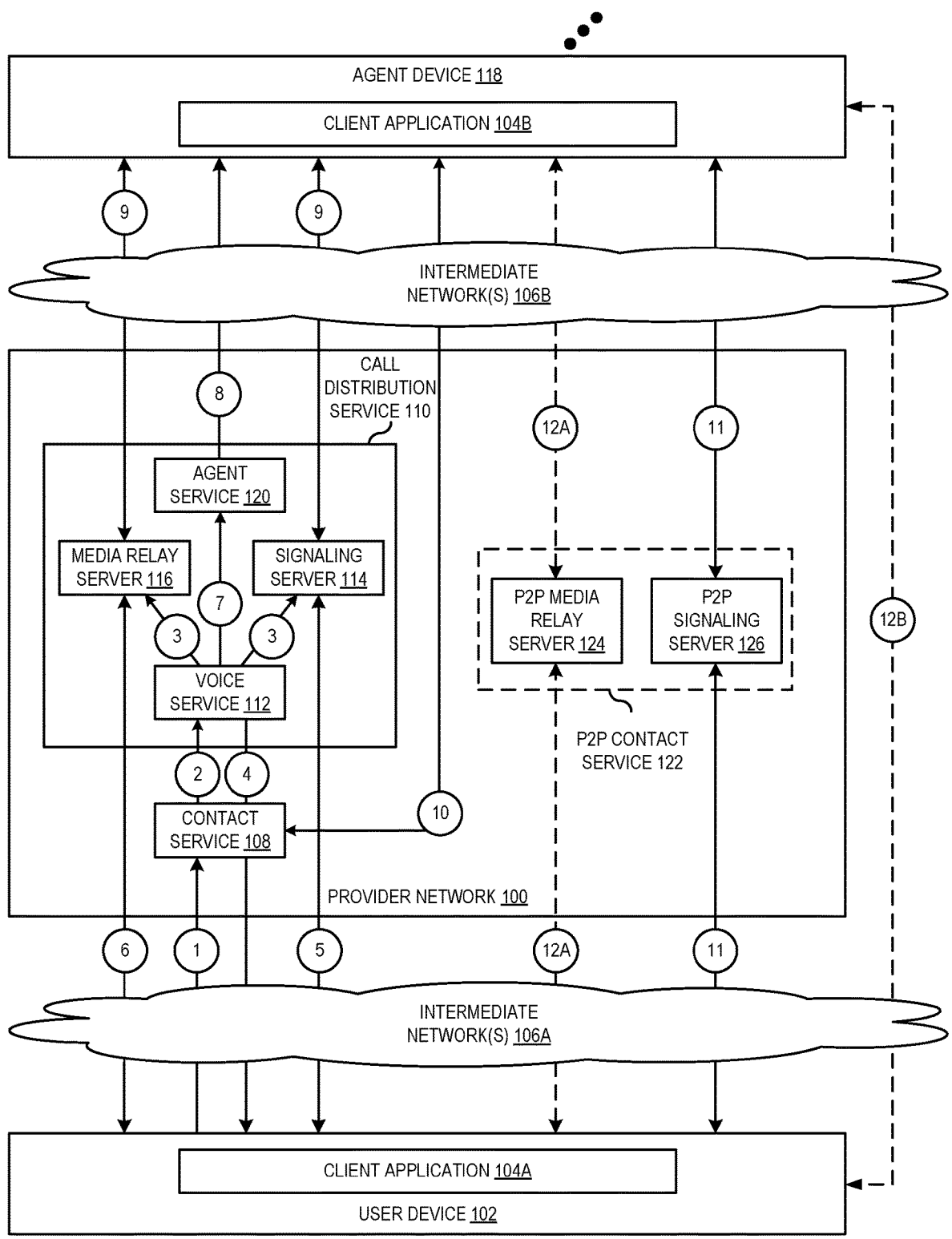
FIG. 1 is a diagram illustrating an environment for hybrid teleconferencing according to some embodiments.

FIG. 1 is a diagram illustrating an environment for hybrid teleconferencing according to some embodiments. As shown in FIG. 1, a user device 102, such as a phone, tablet, laptop computer, desktop computer, or other computing device, can include a client application 104A. The client application 104A may include a web browser, teleconferencing application, or other application executing thereon, through which a user may contact an agent. Although embodiments are described with respect to telemedicine providers, embodiments may be implemented in various teleconferencing domains. Using the client application 104A, the user may request to be connected with a telemedicine provider (or other agent). The client application, at numeral 1, can send a request to a contact service 108 over intermediate network(s) 106A (e.g., the internet). In various embodiments, the request may be made using one or more application programming interfaces (APIs), such as a representational state transfer (REST) API, or other web services API. Contact service 108 may serve as an interface between user devices and a call distribution service 110 implemented in provider network 100. In some embodiments, contact service 108 can determine whether a particular call is to be connected using both the P2P connection and the call distribution service connection, or only through the call distribution service connection.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106A and 106B (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

After receiving a request to initiate a new call at numeral 1, contact service 108 can send a request to voice service 112 of call distribution service 110. Voice service 112 may be accessible via an API gateway or other endpoint. In some embodiments, the voice service 112 can authenticate the request to initiate a new call. For example, the request may include credentials provided by the client application 104A in the initial request sent to contact service 108. In some embodiments, the request may be authenticated prior to it being received by voice service 112. Once authenticated, voice service 112 can then perform call configuration. In some embodiments, WebRTC may be used for media connections. WebRTC enables web browsers to exchange media in real time. For example, video calls may be made between web browsers using WebRTC. The voice service 112, at numeral 3, can configure signaling server(s) 114 and, depending on implementation, session traversal utilities for network address translation (STUN) server(s) or traversal using relay network address translation (TURN) server(s) 116. Signaling servers 114 enable the client application 104A on user device 102 to exchange session description protocol (SDP) with an agent to establish a call via a media relay server 116, such as a TURN server. The SDP can define call requirements of the user device, such as codec requirements, network details, device details, and other data needed to establish a call session such as encryption keys. Both the client application 104A on user device 102, and a client device 104B on the agent device 118 may provide an SDP to signaling server 114 which may then identify a media relay server 116 that meets the technical requirements of both parties to the call. In some embodiments, multiple candidate servers may be provided.

At numeral 4, references to the signaling server(s) and media relay server(s) can be returned to the client application 104A on user device 102. The references may include URLs, URIs, or other endpoint data that enables the client application to connect to the signaling server(s) and media relay server(s). At numeral 5, the client application 104A can provide its SDP to the signaling server 114. At numeral 6, the client application 104A can connect to the media relay server and perform address discovery, for example using the interactive connectivity establishment (ICE) framework provided by WebRTC. This establishes the user-side of the call. In response, at numeral 7, the voice service 112 can send a request to agent service 120 to identify an available provider. At numeral 8, the agent service can provide the endpoint data for the signaling server and media relay server to the available provider's client application 104B executing on agent device 118.

In some embodiments, an identifier associated with the user can be provided to the provider at numeral 8 along with the endpoint data for call distribution service 110. The identifier may be a token associated with the user which may be used by the provider to obtain information about the user.

The identifier may be tokenized to prevent identifiable information about the call session being established from being intercepted. The identifier may itself be sensitive information, as such the token may be a representation of the identifier that maps to the identifier. For example, the token may be used to retrieve a medical file associated with the user. The provider can determine whether to accept the call based on the information about the user retrieved using the identifier. The provider, such as a doctor, nurse, or other telemedicine provider, can accept the call through client application 104B and the client application can connect, at numeral 9, to the signaling server 114 and media relay server 116 using the endpoint data received from the agent service 120.

The process described above with respect to numerals 1-9 establishes a first connection between a user and an agent. The media relay server can be used to transfer the audio and video data of the teleconference. However, this can lead to reduced performance due to limited bandwidth availability through the call distribution service and the longer network path between the user and the provider. Additionally, such a connection routes the content of the teleconference through the servers of the call distribution service. Depending on the content being transferred, this may require additional security be applied to the transfer that the call distribution service is not configured to provide. As such, embodiments provide a second connection via a peer to peer (P2P) contact service 122 for the media stream.

In some embodiments, when a call is accepted by the provider, a contact identifier (e.g., a session token, call type, or other identifier) associated with the session may be sent to the provider and the user by the signaling server 114. At numeral 10, the agent device can use the contact identifier to request endpoint data associated with a P2P contact service 122. In some embodiments, the contact service may also provide endpoint data associated with the P2P contact service to the user. The P2P endpoint data may include address information for one or more P2P media relay servers 124 and one or more P2P signaling servers 126. In some embodiments, the P2P media relay servers and P2P signaling servers may be owned by separate services, maintained in separate private networks, or otherwise provided separately. This may be used to improve security. For example, encryption keys may be provided to the agent device and the user device via P2P signaling server 126 and then used to open a secure connection using P2P media relay server 124. In some embodiments, the encryption techniques used may be selected to meet standards for handling personal health information (PHI) securely, such as Advanced Encryption Standard (AES) 128, 192 or 256-bit encryption, OpenPGP, S/MIME, etc. If the P2P signaling server and the P2P media relay server are implemented as separate services, then if one were to be compromised personal health information (PHI) would not be exposed (e.g., if the signaling server is compromised the keys could be exposed but there is no media flowing through the signaling server to be decrypted, likewise if the P2P media relay server were compromised the keys would secure with the signaling server and could not be used to decrypt the media stream). This reduces the risk of PHI being intercepted by a man-in-the-middle attack, or other attack while the data is in flight between the agent device and the user device.

At numeral 11, the agent device and the user device may each connect to the P2P signaling server 126 based on the endpoint data. Using the contact identifier associated with the P2P session, each peer can identify one another and perform WebRTC address discovery using the candidate media relay server(s) 124. The media relay servers 124 may include STUN servers that facilitate direct P2P connections between the peers or TURN servers that act as a relay between the peers, depending on the network configuration of each peer. An SDP offer can then be constructed and sent via the P2P signaling server directly to the other peer. Using the SDP, P2P media stream (e.g., audio and video streams) can be established which are shown and played on each client application 104A and 104B. Depending on network topology, the P2P media stream can be established via P2P media relay server 124 (e.g., a TURN server), as shown at 12A, or the P2P media stream may be established directly between the agent device and client device based on routing information obtained from the P2P media relay server 124 (e.g., a STUN server), as shown at 12B.

Once the P2P media streams are established, the teleconference is in progress between the user and the provider. In addition to the media streams which are shown and played on their respective devices via the P2P connection, a second audio stream is additionally provided to the call distribution service 110 via the open connection to media relay server(s) 116. This second audio stream is used by the call distribution service 110 to perform transcription, collect metrics (e.g., call duration, provider availability, user wait time, etc.), and/or other data about the connection. In some embodiments, audio data from the second audio stream may be sent to each client application 104A and 104B, however this audio may be ignored by each device. As a result, only the media received via the P2P connection is displayed/played on each device. In some embodiments, audio may only be sent to the call distribution service 110 from each device, and the call distribution service 110 does not provide audio data to either device. This may reduce the bandwidth required associated with the second audio connection.

In some embodiments, call distribution service 110 can transcribe the second audio stream in real time. The audio data may be transcribed using a variety of automatic speech recognition (ASR) techniques, including Speech to Text, Hidden Markov models, machine learning techniques, etc. This may assist the provider with potential diagnoses, provide questions to ask during the call, and prepare notes about the call that are ready when the call is complete. In some embodiments, the second audio stream may be used to provide real-time translation of the audio stream. The translated audio data may be presented to the provider and user either through captions or a separate audio feed (e.g., text to speech).

In some embodiments, additional data may be shared over the P2P connection via the P2P media relay server(s) 124. For example, screenshots and/or photos may be obtained from the user device. The user device may include a camera which the user can position over an area of interest (e.g., a wound, rash, or other medical condition that is visible on their person). The user can capture an image of the area of interest and the image is sent over the P2P media connection to the provider. Additionally, or alternatively, the provide may send a capture command to the user device via the P2P signaling server (126) which causes the user device 102 to capture image data and send the image data to the provider over the P2P media connection. This keeps any potentially sensitive data, such as health information, separate from the routing information.

In some embodiments, the user device 102 and/or the agent device 118 may include a plurality of input devices that can capture media to be transmitted over the P2P media connection. For example, an agent device may include a throat camera, ear camera, etc. that can capture images of a patient. The client application 104A, 104B can be used to select the input device that is used to provide media data over the P2P media connection, enabling the user and/or provider to swap between different input devices.

Figure 2:
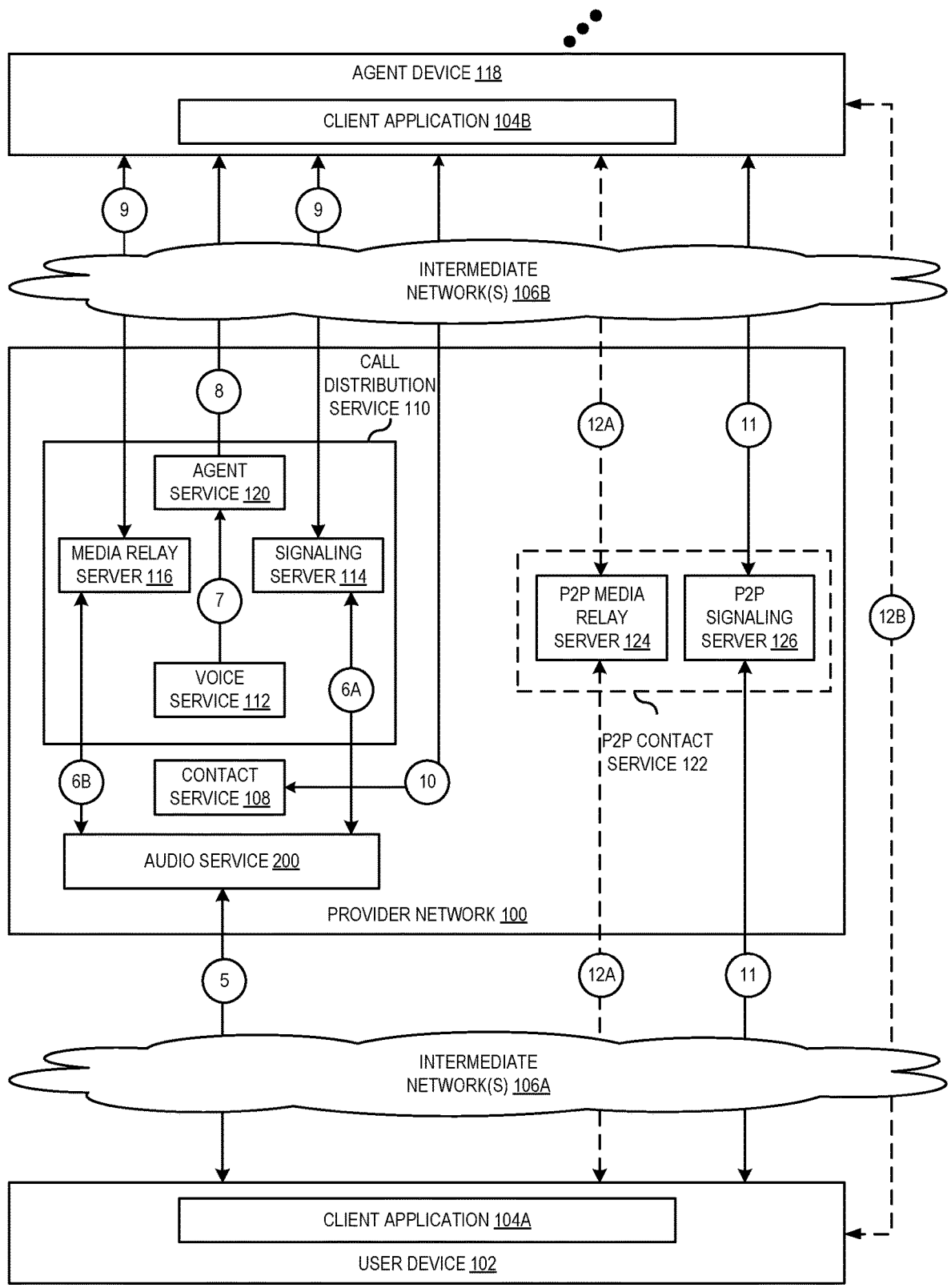
FIG. 2 is a diagram illustrating an alternative environment for hybrid teleconferencing according to some embodiments.

FIG. 2 is a diagram illustrating an alternative environment for hybrid teleconferencing according to some embodiments. In the embodiment of FIG. 2, the steps associated with numerals 1-4 of FIG. 1 have already been completed. Starting with numeral 5, rather than opening an audio connection from the user device to the call distribution service, the client application 104A can send a request to an audio service 200 in provider network 100. The client application 104A can provide the call distribution endpoint service 110 endpoints associated with media relay server 116 and signaling server 114 to the audio service. At numeral 6A, the audio service can connect to the signaling server 114 using the endpoint data received from the client application 104A, and at numeral 6B, the audio service 200 can connect to the media relay server 116 using the endpoint data received from the client application 104A. The audio service 200 can provide audio data to the media relay server 116, such as prerecorded audio data (music, static, or other audio data). In some embodiments, the agent device may likewise connect to the audio service 200 instead of connecting directly to the call distribution service. Call distribution service can then collect metrics related to the call, such as call duration, provider availability, user wait time, etc., based on the session that has been opened on behalf of the agent device and the user device. As a result, no audio data from user device or agent device, which may include personal health information (PHI), is sent to call distribution service 110, instead only the audio provided by audio service 200 is sent to the call distribution service. This reduces the risk of PHI being exposed through the call distribution service, while still taking advantage of the call routing capabilities of the call distribution service.

Figure 3:
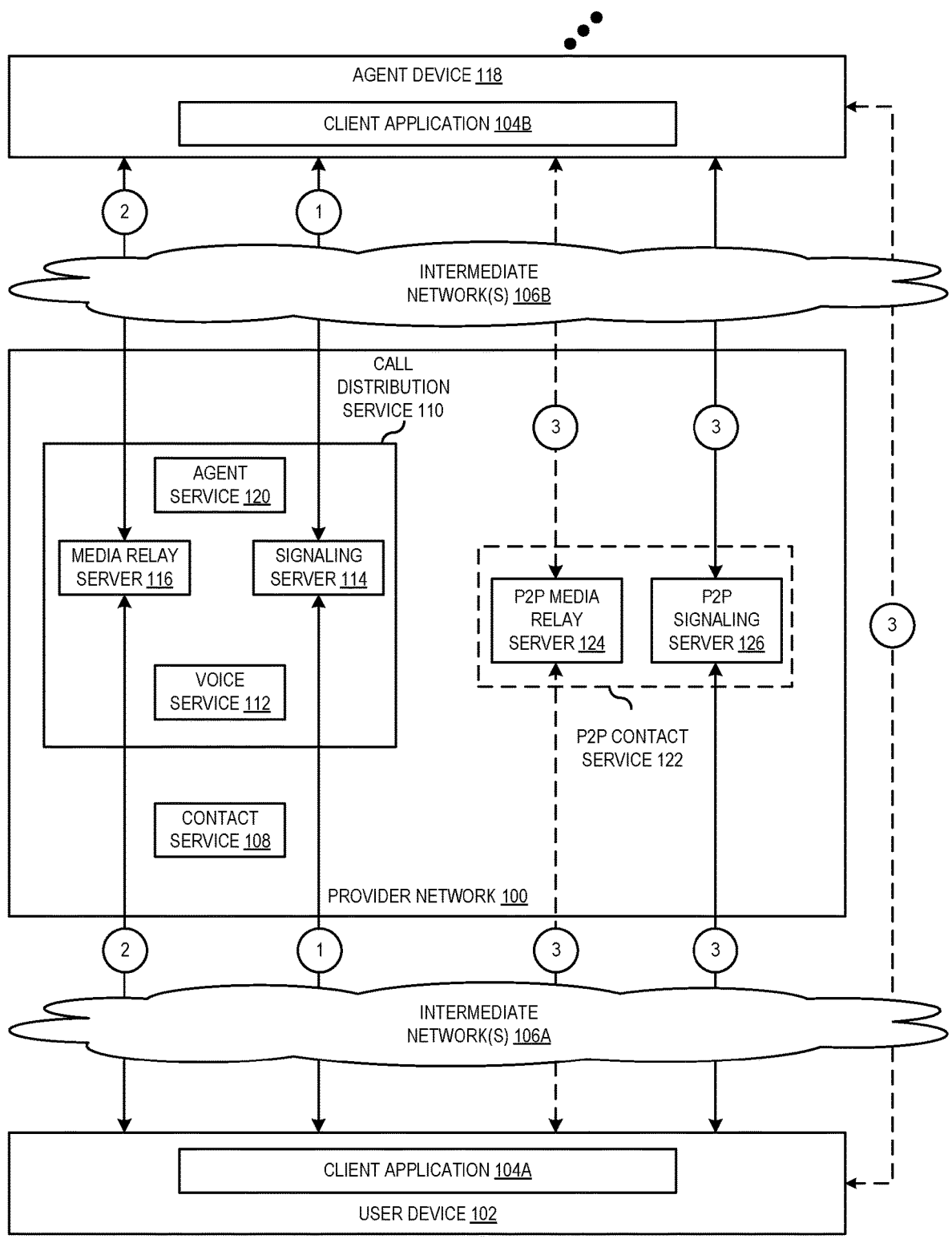
FIG. 3 is a diagram illustrating call disconnect and reconnect in a hybrid teleconferencing system according to some embodiments.

FIG. 3 is a diagram illustrating call disconnect and reconnect in a hybrid teleconferencing system according to some embodiments. As shown in FIG. 3, when a call is ended, an end call command can be sent from client application 104A or 104B to signaling server 114, as shown at numeral 1. After the end call command is received, call distribution service 110 can end the second audio connection via media relay servicer 116 at numeral 2. Once the second audio connection is ended, the client application 104B can detect that the session has ended, and the P2P connection can be torn down as shown at numeral 3.

As described above, if an explicit end call command is received, then the session can be considered properly ended. However, if a call was mistakenly disconnected (e.g., the web socket disconnects without an explicit end call command), then the client application that disconnected can reconnect to the same socket using a refresh token. As discussed above, each session may be associated with a session token which is used by each peer to establish the P2P media connection. Each session token may expire after 15 minutes (or other configurable interval). To enable reconnections in the event of an errant disconnect, a refresh token may be generated every 10 minutes (or other configurable interval that is less than the session token expiration time). The refresh token can be sent to each peer by P2P signaling server 126.

Figure 4:
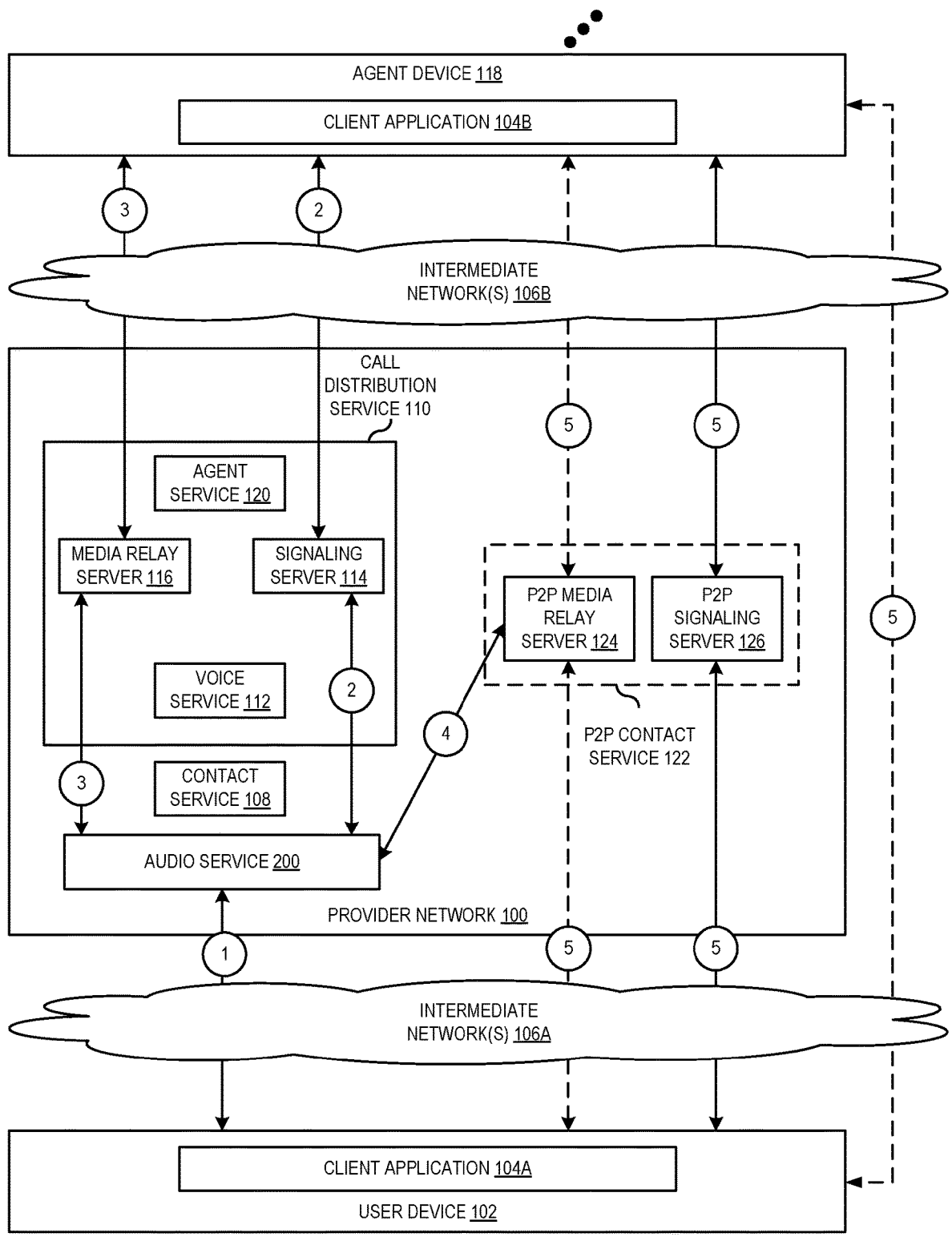
FIG. 4 is a diagram illustrating an alternative call disconnect and reconnect in a hybrid teleconferencing system according to some embodiments.

FIG. 4 is a diagram illustrating an alternative call disconnect and reconnect in a hybrid teleconferencing system according to some embodiments. As shown in FIG. 4, when a call is ended, an end call command can be sent from client application 104A or 104B to audio service 200, as shown at numeral 1. After the end call command is received, audio service 200 can send an end call command to signaling server 114, as shown at numeral 2, and call distribution service 110 can end the second audio connection via media relay servicer 116 at numeral 3. Once the second audio connection is ended, audio service 200 can send a message to P2P media relay server 124, at numeral 4, indicating that the session has ended, and the P2P connection can be torn down as shown at numeral 5. In some embodiments, the P2P media connection may be closed first, when the user or agent ends the call. In such embodiments, the P2P media relay server may detect that the P2P media connection has been closed and send an end call command to the audio service 200 to end the second audio connection via call distribution service 110.

Figure 5:
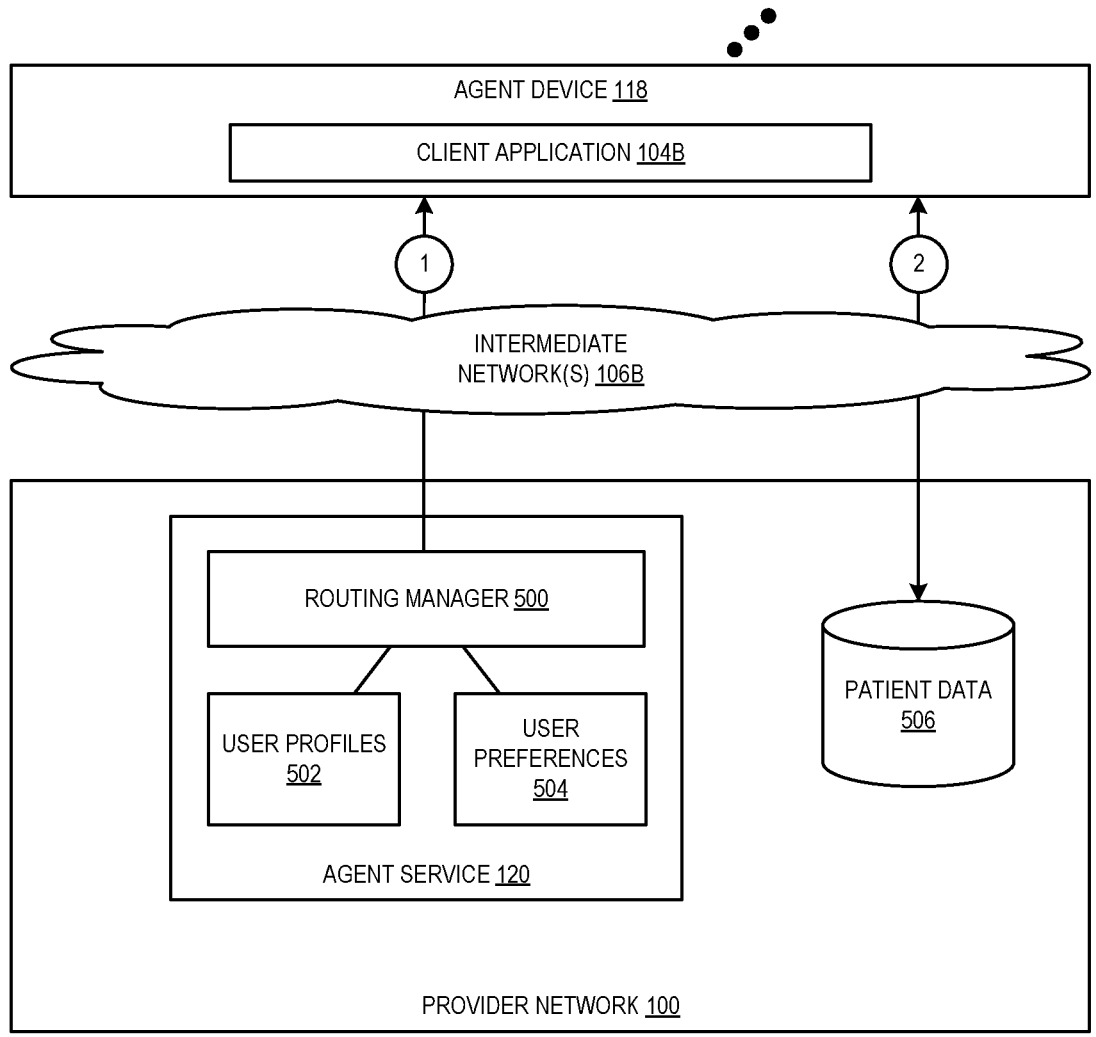
FIG. 5 is a diagram illustrating call routing in a hybrid teleconferencing system according to some embodiments.

FIG. 5 is a diagram illustrating call routing in a hybrid teleconferencing system according to some embodiments. As discussed, when a user initiates a call, agent service 120 can identify an available provider. In some embodiments, the agent service may identify a first available provider to reduce wait time for the user. Additionally, or alternatively, other data may be used by the agent service 120 to route a call to one or more particular providers. As shown in FIG. 5, agent service 120 may include a routing manager 500. Routing manager 500 may maintain a list of available providers which is updated as providers accept and end calls. The list of available providers may identify the providers by a reference to their associated agent device. For example, a URL or URI associated with their device on the network, a client identifier, or other reference that can be used to send messages to the provider via their agent device. In some embodiments, routing manager 500 may obtain provider availability from a storage location in provider network 100 maintained by another service or entity. In some embodiments, the routing manager 500 may additionally use information stored in user profiles 502 and/or user preferences 504 when routing a call to a particular provider. For example, user profiles 502 may include profiles for a plurality of different users. Each profile may include basic information about the user which can be referenced by an identifier, this information may include a picture of the user, the name of the user, etc. In some embodiments, the user profile may include references to one or more providers whom the user has previously visited (e.g., a provider history). In some embodiments, the provider history may include ratings from the user or other feedback. The routing manager can select an available provider to whom to send the call based on the feedback provided by the user stored in the user profile. In some embodiments, the user preferences 504 may identify one or more providers, or groups of providers, to connect to. For example, user preferences 504 may include a ranked list of providers and/or groups of providers and routing manager 500 may select the highest ranked provider or group of providers that is currently available to route the call to. In some embodiments, preferences may also include provider specialty, provider gender, provider style (e.g., a specialized group of doctors that focus on the patient's particular health or lifestyle profile), etc.

In some embodiments, when a provider is identified, routing manager 500 can send a customer identifier associated with the user to the identified provider, as shown at numeral 1. In some embodiments, the customer identifier and user information (e.g., name, picture, etc.) may be sent as an attribute in an HTTP request, or via another messaging system. The provider can use the customer identifier and user information to determine whether to accept the call. For example, the provider may recognize the user from a prior visit and accept the call or may not recognize the user and choose not to accept the call. In some embodiments, the user information may include details about the call, such as a reason for the call or other call details. The provider may choose to accept or decline the call based on the call details (e.g., if another provider is better suited to for the specific details of the call). Once the call has been accepted, as shown at numeral 2, the provider can request a health record associated with the customer identifier. The health record may be stored in a secured data store configured to store electronic health records. Once the provider has obtained the user's health records, they can be displayed to the provider on agent device 118.

In some embodiments, depending on the user's health concerns, the user may choose to wait for a particular provider (e.g., based on the user's provider preferences). The user may be provided with an estimated wait time and may then choose whether to wait for the provider to be available or to be connected to a different provider with less wait time. In some embodiments, if the user chooses to wait, they may receive an alert through client application 104A when the provider is available and may then initiate a call to the provider, as discussed above. In some embodiments, provider availability may be determined based on demand for a particular provider and overall provider demand For example, if demand for a particular provider is high, but the overall demand is low, the provider may become unavailable for a period of time while new incoming calls are load balanced to other providers.

Figure 6:
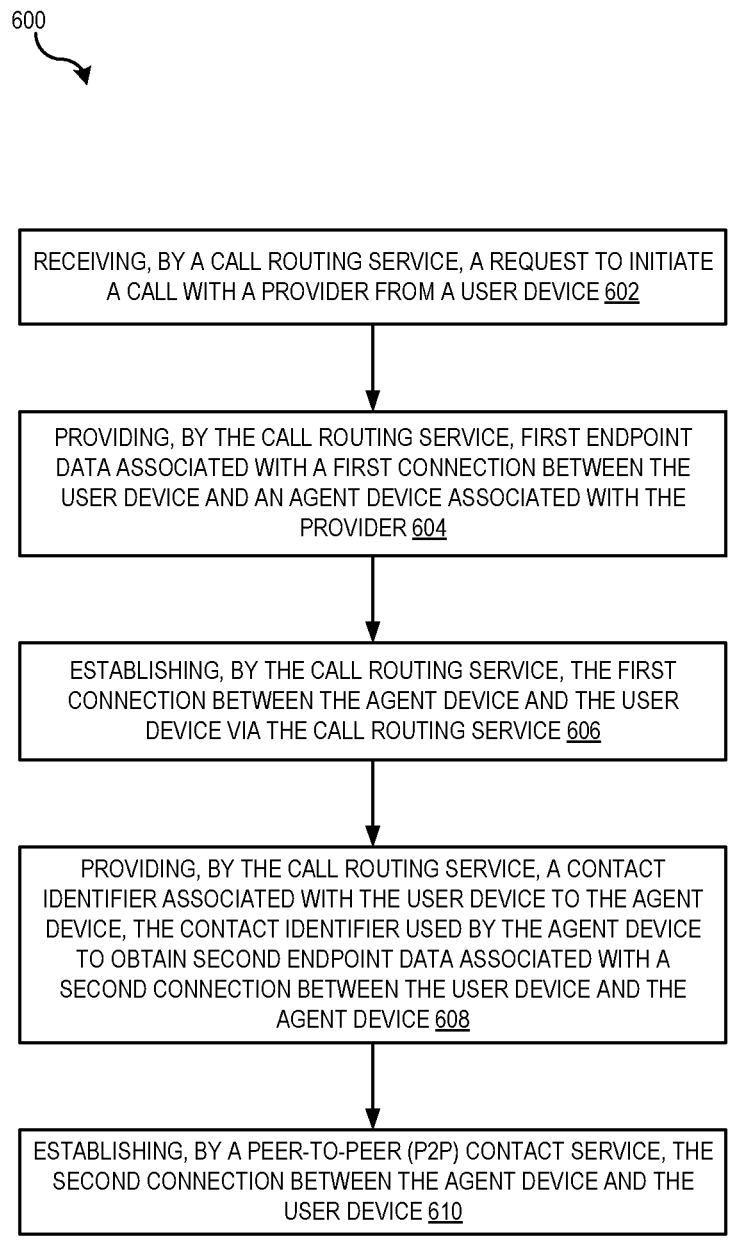
FIG. 6 is a flow diagram illustrating operations of a method for hybrid teleconferencing according to some embodiments.

FIG. 6 is a flow diagram illustrating operations of a method for hybrid teleconferencing according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by call distribution service 110 or P2P contact service 122 of the other figures.

The operations 600 include, at block 602, receiving, by a call routing service, a request to initiate a call with a provider from a user device. The operations 600 further include, at block 604, providing, by the call routing service, first endpoint data associated with a first connection between the user device and an agent device associated with the provider.

The operations 600 further include, at block 606, establishing the first connection between the agent device and the user device via the call routing service. In some embodiments, establishing the first connection may further include sending first endpoint data for the plurality of endpoints to the user device, the first endpoint data including references to at least one signaling server and at least one media server in the call routing service, identifying the provider from a plurality of available providers, sending the first endpoint data for the plurality of endpoints to an agent device associated with the provider. In some embodiments, identifying the provider from a plurality of available providers, may further comprise selecting a provider from a list of a plurality of providers based at least on one or more of provider availability, a user profile associated with the user, or user preferences associated with the user.

In some embodiments, the first connection is an audio connection, and wherein the call routing service receives audio data from the user device and the agent device over the audio connection. In some embodiments, the call routing service may be configured to collect a plurality of metrics associated with the call based at least on the audio connection, the plurality of metrics including one or more of call duration, provider availability, or user wait time.

In some embodiments, no audio data is provided by the call routing service to the user device or the agent device over the first connection. In some embodiments, the audio data received by the user device or the agent device over the first connection is ignored by the user device or the agent device. In some embodiments, the first connection is an audio connection, and wherein the call routing service receives audio data provided by an audio service in the provider network, the audio service to connect to the call routing service on behalf of the user device and the agent device.

The operations 600 further include, at block 608, providing, by the call routing service, a contact identifier associated with the user device to the agent device, the contact identifier used by the agent device to obtain second endpoint data associated with a second connection between the user device and the agent device. The operations 600 further include, at block 610, establishing, by a peer-to-peer (P2P) contact service, the second connection between the agent device and the user device. In some embodiments, establishing the second connection may further include connecting, by the user device and the agent device, to a P2P signaling server of the P2P contact service based at least on the second endpoint data, the second endpoint data including references to the P2P signaling server and the P2P media server, and providing encryption keys for the call from the P2P signaling server to the user device and the agent device. In some embodiments, establishing the second connection may further include connecting, by the user device and the agent device, to the P2P media server of the P2P contact service using the encryption keys received from the P2P signaling server and the reference to the P2P media server, and establishing a P2P session between the user device and the agent device, wherein audio data and video data are shared between the user device and the agent device over the P2P session.

In some embodiments, the operations may include receiving, by a call routing service, a request to initiate a call with a provider from a user device, configuring a first plurality of endpoints for the call, the first plurality of endpoints including at least one signaling server and at least one media server, sending first endpoint data for the plurality of endpoints to the user device, identifying the provider from a plurality of available providers, sending the first endpoint data for the plurality of endpoints to an agent device associated with the provider, establishing an audio connection between the call routing service and the agent device and the user device, and sending a contact identifier associated with the user device to the agent device, the contact identifier used by the agent device to obtain second endpoint data for a second plurality of endpoints to the user device and the agent device, the second plurality of endpoints including a peer-to-peer (P2P) media server and a P2P signaling server in a P2P contact service, wherein a media connection is established between the agent device and the user device via the P2P contact service.

In some embodiments, the operations may further include receiving an end call command at the at least one signaling server, closing the audio connection between the call routing service and the agent device and the user device, and wherein the user device and agent device each detect that the audio connection is closed and disconnect from the P2P contact service.

Telemedicine enables health care providers to provide care to remote patients using video teleconference systems. A telemedicine session can be started over WebRTC or other video call technologies. The provider system may include a computing device connected to a webcam and microphone facing the provider's chair. However, such setup limits the provider's movements to a certain area to remain in the field of view of the webcam. In order to provide an enhanced customer experience, embodiments provider a provider system that follows the provider's movements and keeps the provider in the field of view of the webcam. Embodiments may include a custom hardware webcam mount that can be attached to various cameras and enable the attached camera to move via machine-controlled rotation using a motor (such as a step motor). The camera video stream can be intercepted by a face-tracking application that identifies a position of the provider's face in the video stream and determines a real-time distance to the screen center. When a difference is detected, the face-tracking application can send an event to the custom hardware mount to rotate the camera in order to compensate for the measured distance, bringing the subject back to the center position of the screen.

Figure 7:
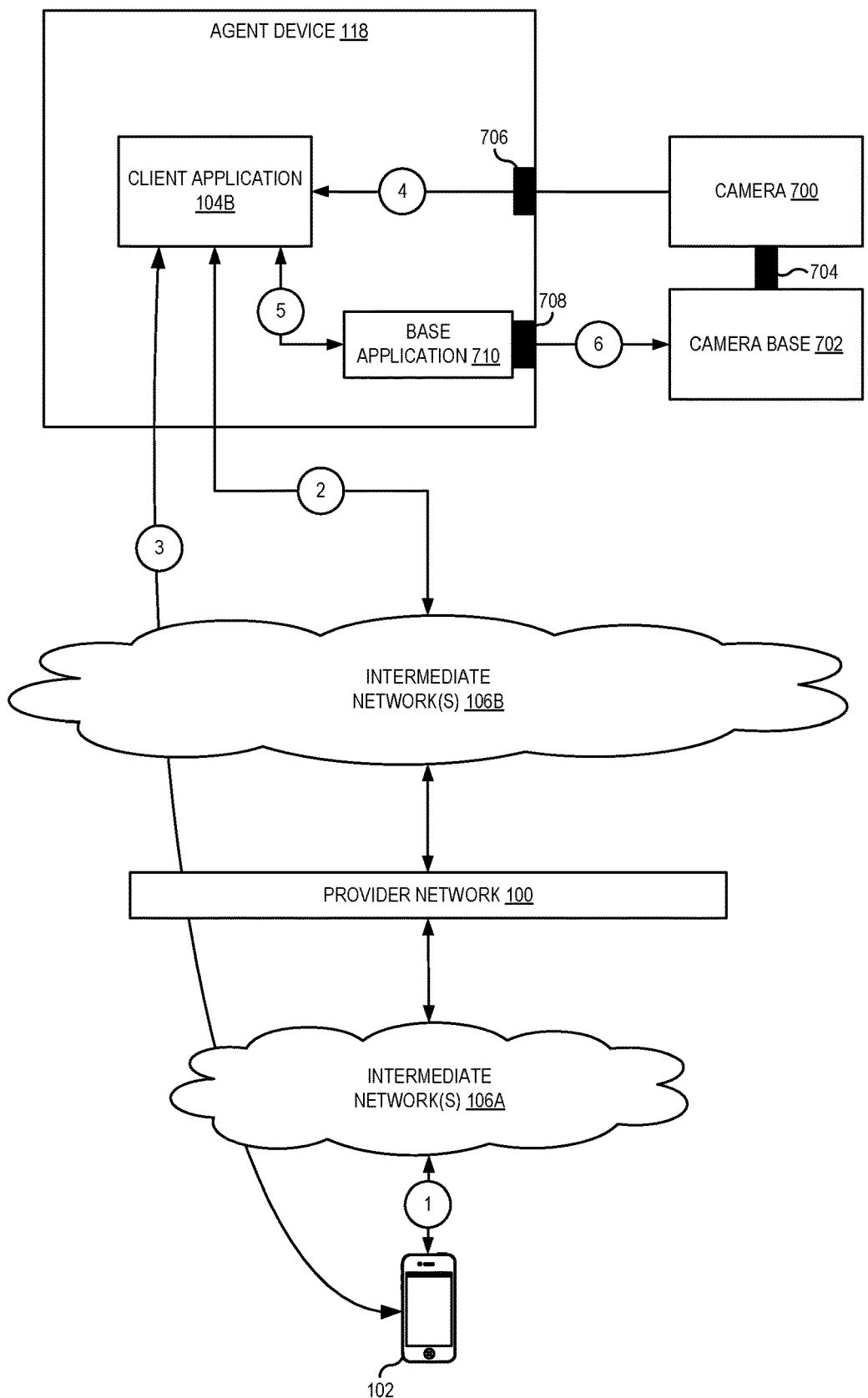
FIG. 7 is a diagram illustrating an environment for a face-tracking telemedicine system according to some embodiments.

FIG. 7 is a diagram illustrating an environment for a face-tracking telemedicine system according to some embodiments. As shown in FIG. 7, a user can initiate a call with a provider using user device 102, as shown at numeral 1. As discussed above with respect to FIGS. 1, the call can be routed to a provider using agent device 118, as shown at numeral 2. Once the call is accepted, a second, peer-to-peer (P2P) connection can be made between the agent device 119 and the user device 102, as shown at numeral 3. Media, including video and audio streams, can be streamed from the agent device 118 to the user device 102 over the P2P connection. In some embodiments, the call may be established as described above with respect to FIGS. 1-4.

As discussed, agent device 118 can include a laptop computer, desktop computer, or other computing device. The agent device can be connected to a camera 700, such as a webcam or other video capture device, via a first connector 706, such as a universal serial bus (USB) connector and/or other connectors (e.g., Firewire, Ethernet, Thunderbolt, eSATA/eSATAp, etc.). The camera 700 may be mounted to a custom hardware camera base 702 which includes a step motor, or other motorized device. The camera can be mounted to the camera base via a universal camera mount 704, such as a friction mount, threaded mount, or other universal mount. The motor of the camera mount can function to change the direction in which the mounted camera is pointed in the X and Y directions.

When the camera is connected to the agent device 118 and a call is accepted via client application 104B, video data can be obtained from the camera 700 via connector 706 by client application 104B, as shown at numeral 4. This video data can be passed to client device 102 over the P2P connection. The client application 104B can analyze the video data received from the camera as it is received and identify a location of the provider's face in at least one frame of the video data using face tracking software (e.g., OpenCV, machine learning techniques, etc.). From the position where the face is found, the client application 104B can calculate the difference between the face position and the center of the frame of the video data. The client application 104B can convert that difference into movement instructions for the camera base. Depending on the motor in use in the motorized camera mount, different movement instructions may be generated. For example, where a step motor is used, the movement instruction may be a step instruction. At numeral 5, the movement instructions can be sent to base application 710. In some embodiments, base application 710 listens for movement instructions generated by client application 104B. In some embodiments, the instructions may be generated in a text format, such as JavaScript Object Notation (JSON), XML, or other format. At numeral 6, the instructions are sent to the camera base 702 via connector 708 and the instructions are executed by the camera base which causes the direction of the camera 700 to move to track the provider's face.

In some embodiments, the client application 104B can sample the video data at regular intervals (e.g., every half second or other interval) to find the provider's face and then adjust the camera. This sampling rate can be modified as needed via client application 104B by the provider or via instructions received from provider network 100. In some embodiments, the sampling rate may be based on a rate at which the movement instruction is executed by the camera base. The rate the camera base executes the movement instruction may be a rate that has been determined to make the movements appear smooth to a viewer (e.g., approximately 50 Hz or greater).

Figure 8:
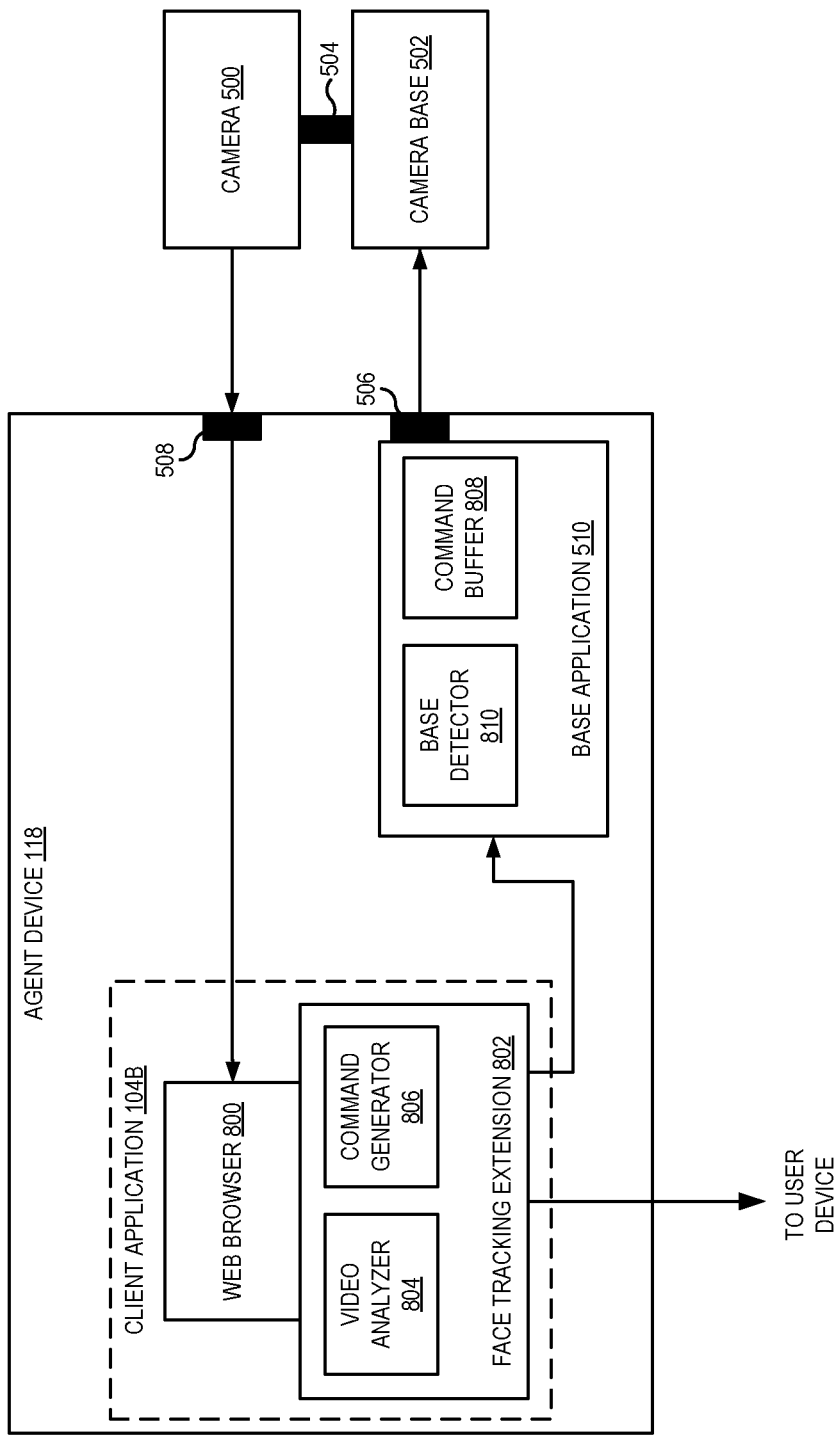
FIG. 8 is a diagram illustrating a provider device in a face-tracking telemedicine system according to some embodiments.

FIG. 8 is a diagram illustrating a provider device in a face-tracking telemedicine system according to some embodiments. As shown in FIG. 8, in some embodiments, client application 104B may include a web browser 800 and a face tracking extension 802. Web browser 800 can be used to execute a web-based videoconference application. For example, the provider can log into a portal-based web application hosted in provider network 100. When the provider successfully logs into the videoconference application using web browser 800 (e.g., providing log in credentials through a portal or other web-based interface), face tracking extension 802 can be activated. In some embodiments, the camera base is physically connected to the agent device 118 and can only be activated by the videoconference application after the provider successfully logs in. In some embodiments, the provider can choose whether to activate or deactivate the face tracking functionality of the camera base 702 after logging into the videoconference application via web browser 800. By implementing face tracking functionality through a browser extension, no changes need to be made directly to the videoconference application. In some embodiments, the browser extension may be associated with the domain of the videoconference application accessed through the web browser. When the domain of the videoconference application is visited in the web browser, the browser extension can access portions of the web page, including frames of video data that are received from the agent's camera 700. These frames can be analyzed by the browser extension to perform face tracking.

The face tracking extension 802 can include a video analyzer 804 and a command generator 806. The face tracking extension 802 can intercept video data as it is being streamed to the user device over the P2P media connection. For example, the face tracking extension can sample a frame of the video data every .5 seconds (or other configurable interval). When a frame has been sampled, video analyzer 804 can identify a center of the provider's face using face detection techniques. The center of the face may be identified as one or more pixels corresponding to the provider's nose. Alternative techniques of identifying a center point of the provider's face may also be used. The center point of the provider's face is then compared to a center point of the video frame. For example, a difference in the X direction and a difference in the Y direction can be calculated between the two points. In some embodiments, a vector representing the distance between the two points can be calculated. Command generator 806 can use the difference between the two points to generate a plurality of step instructions to be executed by the step motor built into camera base 702. The command generator can convert the difference between the two points (e.g., in both the X and Y directions) as measured in pixels to steps. As discussed, the commands may be generated in JSON format and can be sent to base application 710 to be passed to camera base 702.

In some embodiments, a browser extension may be unable to communicate directly with camera base 702. As such, the step commands can be sent to a base application 710 to be sent to the camera base 702. In some embodiments, the step instructions can be sent to the base application using a secure socket message, and may attach the step instruction to the secure socket message, such as via HTTP comments or other fields. The step instruction may be stored in a command buffer 808. The base application 710 can include a base detector 810 which can determine whether a camera base is connected to the agent device 118. If no camera base is detected, then the base application ignores the commands If the camera base is found, the base application can determine whether the movement function is activated. If the face tracking functionality is disabled, then the commands can also be ignored, but if face tracking is active then the commands are passed to the camera base 702 from the command buffer 808 via connector 706. As such, all face tracking communication is generated and sent to the camera base locally, rather than via a remote server in provider network 100 or other network location. This provides a more secure solution by not introducing a potential attack vector that could enable an attacker to assume remote control of the camera base.

In some embodiments, the camera 700 and/or camera base 702 can be provisioned for a particular provider or group of providers when it is shipped to the provider. For example, device identifier(s) associated with the camera and/or camera base can be associated with a provider identifier (or several provider identifiers). When a provider logs into the videoconferencing application via web browser 800 and the camera base 702 is detected by the face tracking extension 802, the face tracking extension can verify that the camera base device identifier is associated with the provider identifier which was used to log in. This adds an additional level of security to ensure the provider using the camera and camera base is authorized to use the devices.

In some embodiments, the instructions sent from the browser extension to the base application can be encrypted. Encryption may be performed using various encryption techniques. In some embodiments, the encryption technique used may be selected to meet standards for handling personal health information (PHI) securely, such as Advanced Encryption Standard (AES) 128, 192 or 256-bit encryption, OpenPGP, S/MIME, etc. For example, the secure socket message can be encrypted, and/or the movement instruction can be encrypted. In some embodiments, a first secure connection can be opened between the browser extension and the base application and a second secure channel can be opened between the base application and the camera base. Each secure connection can be a secure socket layer (SSL) connection. By encrypting the secure socket message, the movement instruction, and the connections between the components, the instruction can be securely delivered with a low risk of an unauthorized entity gaining access to the information. Such encryption may further enable compliance with regulations governing the secure handling of personal health information (PHI), such as the Health Insurance Portability and Accountability Act (HIPAA) or other regulations.

Figure 9:
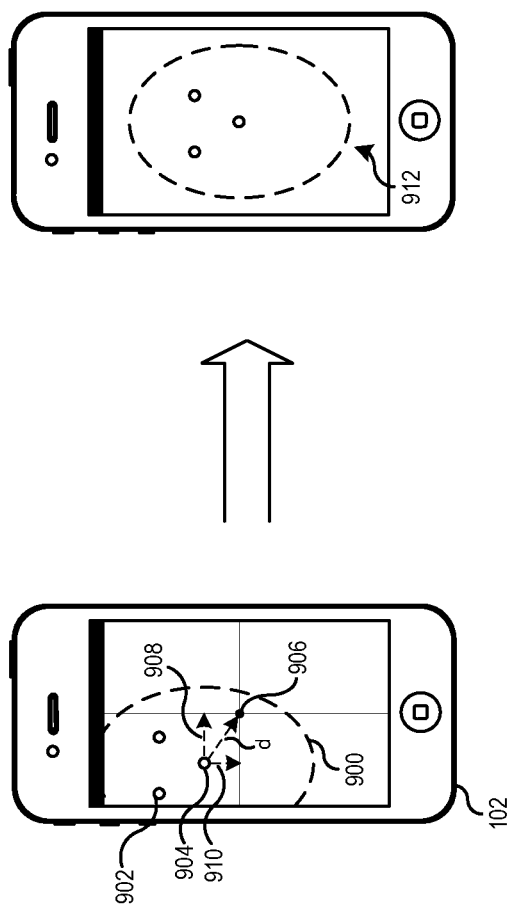
FIG. 9 is a diagram illustrating face-tracking according to some embodiments.

FIG. 9 is a diagram illustrating face-tracking according to some embodiments. As shown in FIG. 9, a user device 102 can display video data received over a P2P connection from the provider's camera. The video data may include a representation of the provider's face 900. The face tracking extension, as discussed above, can identify the provider's face in the video data. For example, in some embodiments one or more feature points 902 of the provider's face may be identified. From the feature points, a center point 904 of the provider's face can be identified. In some embodiments, various face tracking models may be used to identify the provider's face and its position within the video data (e.g., machine learning techniques, OpenCV, etc.). The center point 904 of the provider's face can be compared to the center point 906 of the image data to determine a difference in pixels between the two points. This difference may include a difference in the X direction 908 and a difference in the Y direction 910. In some embodiments, a distance, d, between the two points can be calculated. For example, $$d = \sqrt{(x_2 - x_1)^2 + (y_2 - y_1)^2}$$

where the center point of the provider's face is located at $(x_2, y_2)$ and the center of the video frame is located at $(x_1, y_1)$. The difference in pixels can be converted into a number of steps to be executed to bring the face into center of frame, as shown at 912.

In some embodiments, the camera in use may be a wide angle camera, or may be fitted with a wide angle lens. Such embodiments capture a larger portion of the room in which the provider is located. Instead of adjusting the camera base to track the movements of the provider's face, in some embodiments, the provider's face can be identified in a frame of the wide angle image data, and the image data can be cropped around the provider's face. As the provider moves, the provider's face can be tracked in the image data and the crop can be adjusted. This provides the effect of camera movement without physically moving the camera. In some embodiments, the change in the crop can be made at a rate that appears smooth to the end user (e.g., 50 Hz or greater).

Figure 10:
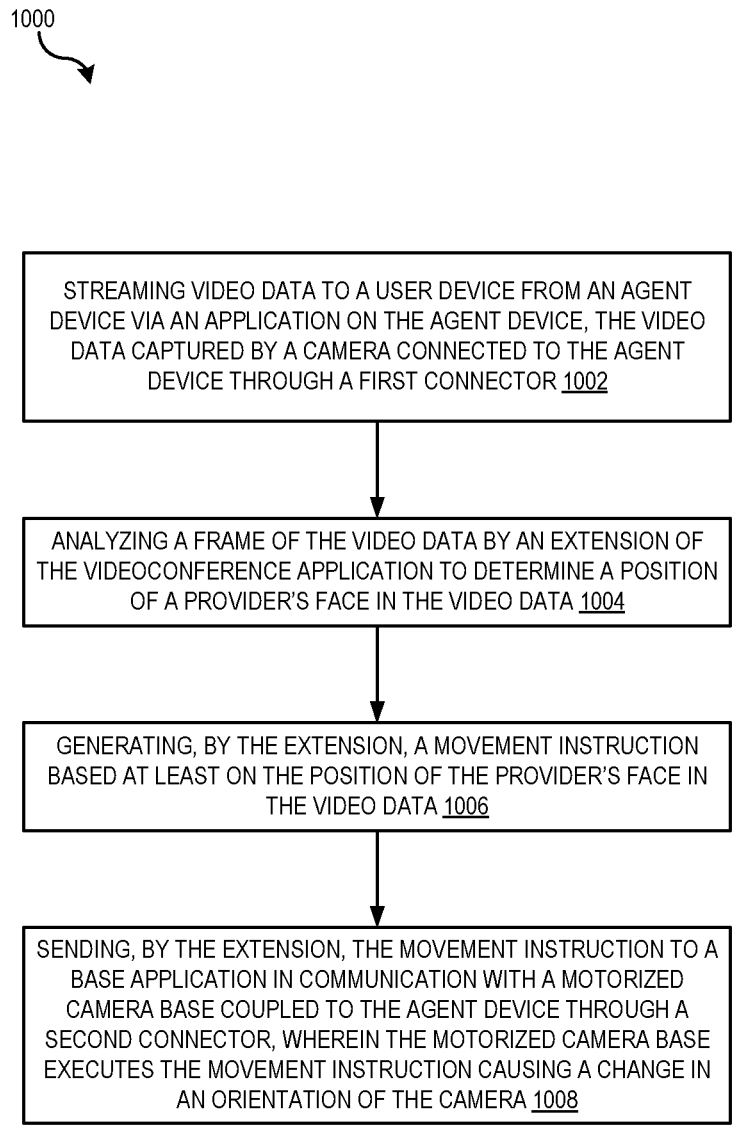
FIG. 10 is a flow diagram illustrating operations of a method for face-tracking in a telemedicine system according to some embodiments.

FIG. 10 is a flow diagram illustrating operations of a method for face-tracking in a telemedicine system according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by agent device 118 and camera base 502 of the other figures.

The operations 1000 include, at block 1002, streaming video data to a user device from an agent device via an application on the agent device, the video data captured by a camera connected to the agent device through a first connector. In some embodiments, the first connector and the second connector are universal serial bus (USB) connectors. In some embodiments, the camera is coupled to the camera base using a universal camera mount, the universal camera mount comprising at least one of a friction mount or a threaded mount.

The operations 1000 further include, at block 1004, analyzing a frame of the video data by an extension of the application to determine a position of a provider's face in the video data. The operations 1000 further include, at block 1006, generating, by the extension, a movement instruction based at least on the position of the provider's face in the video data. In some embodiments, analyzing a frame of the video data may further include determining a distance in pixels from the position of the provider's face to a center of the frame of the video data, converting the distance in pixels to a number of steps, and generating the movement instruction based at least on the number of steps and a step rate.

The operations 1000 further include, at block 1008, sending, by the extension, the movement instruction to a base application in communication with a motorized camera base coupled to the agent device through a second connector, wherein the motorized camera base executes the movement instruction causing a change in an orientation of the camera. In some embodiments, sending, by the extension, the movement instruction to the base application may further include sending a secure socket message from the extension to the base application. In some embodiments, the secure socket message may be a hypertext transfer protocol (HTTP) message, browser-specific message, or other secure message protocol. In some embodiments, the movement instruction is formatted as a JavaScript Object Notation (JSON) file attached to the secure socket message (e.g., as a comment or other message field, payload, etc). In some embodiments, sending a secure socket message from the extension to the base application may further include starting a first secure connection between the face tracking browser extension and the base application, sending the secure socket message to the base application in the first secure connection, starting a second secure connection between the base application and the motorized camera base, and sending the movement instruction to the motorized camera base in the second secure connection.

In some embodiments, the operations 1000 may further include storing, by the base application, the movement instruction in a buffer, detecting, by the base application, the motorized camera base via the second connector, and sending, by the base application, the movement instruction to the motorized camera base from the buffer via the second connector.

In some embodiments, the operations 1000 may further include sending a request to log in to the application through a web browser executing on the agent device, wherein the application is a videoconference web application and wherein the extension is a face tracking browser extension. In some embodiments, the face tracking browser extension is activated by the videoconference web application following log in.

In some embodiments, the operations 1000 may further include determining an interval of time has elapsed since the frame of the video data was analyzed, analyzing a second frame of the video data by the extension to identify a second position of the provider's face in the video data, generating a second movement instruction based at least on the second position of the provider's face, and sending the second movement instruction to the base application.

In some embodiments, the operations 1000, may include sending a request to log in to a videoconference web application through a web browser executing on an agent device, the web browser including a face tracking extension that is activating by the videoconference web application, streaming video data to a user device via the videoconference web application, the video data captured by a camera connected to the agent device through a first connector, intercepting a frame of the video data by a face tracking browser extension installed in the web browser, identifying a position of a provider's face in the video data, determining a distance in pixels from the position of the provider's face to a center of the frame of the video data, generating a step instruction based at least on the distance, sending the step instruction to a base application in communication with a motorized camera base coupled to the agent device through a second connector, wherein the motorized camera base executes the step instruction causing a change in an orientation of the camera.

In some embodiments, generating a step instruction based at least on the distance may further include converting the distance in pixels to a number of steps, and generating the step instruction base at least on the number of steps. In some embodiments, the operations 1000 may further include determining an interval of time has elapsed since the frame of the video data was intercepted, the interval of time based at least on the step rate, intercepting a second frame of the video data by the face tracking browser extension, analyzing the second frame of the video data to identify a second position of the provider's face in the video data, generating a second step instruction based at least on the second position of the provider's face, and sending the second step instruction to the base application.

Figure 11:
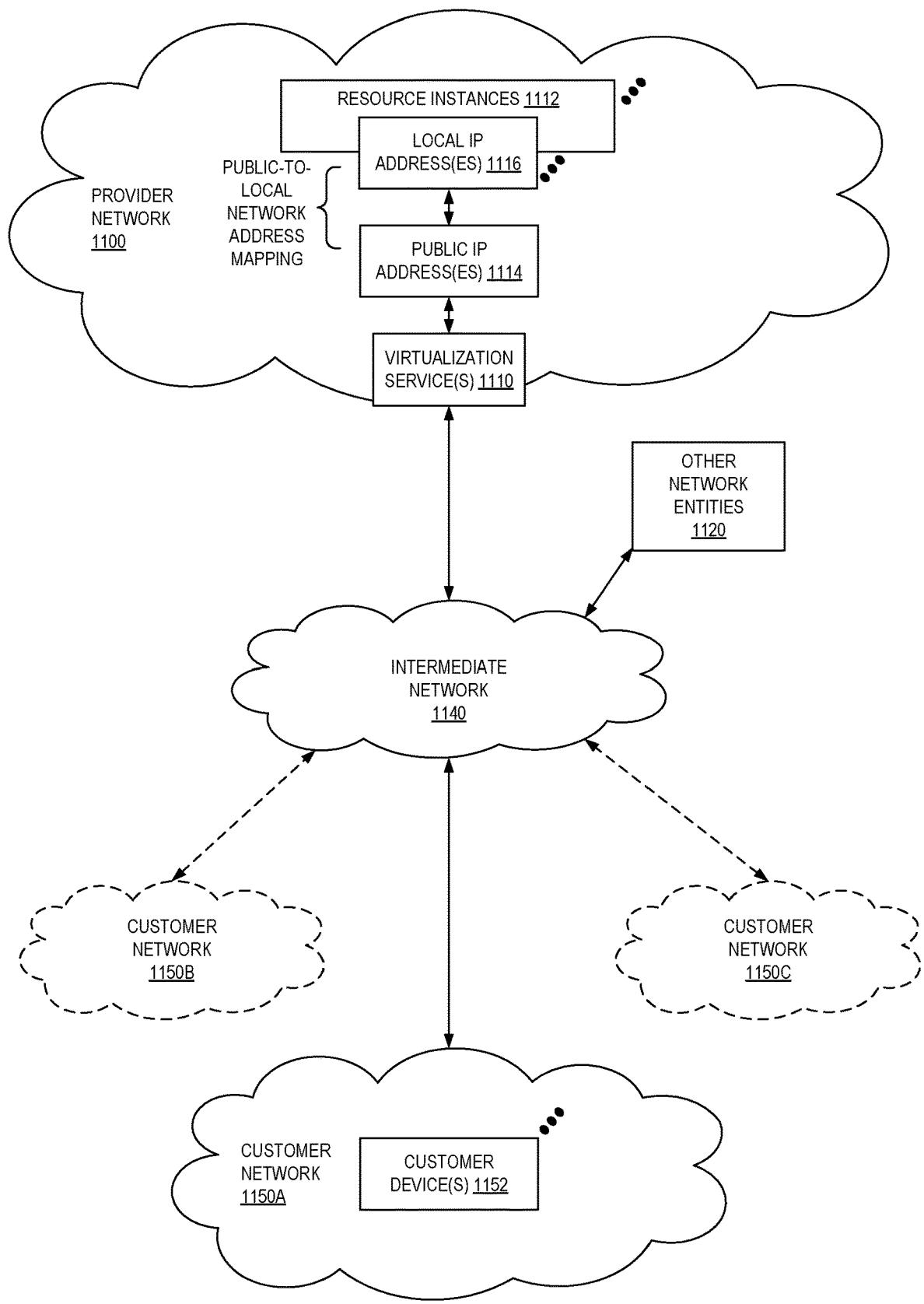
FIG. 11 illustrates an example provider network environment according to some embodiments.

FIG. 11 illustrates an example provider network (or "service provider system") environment according to some embodiments. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
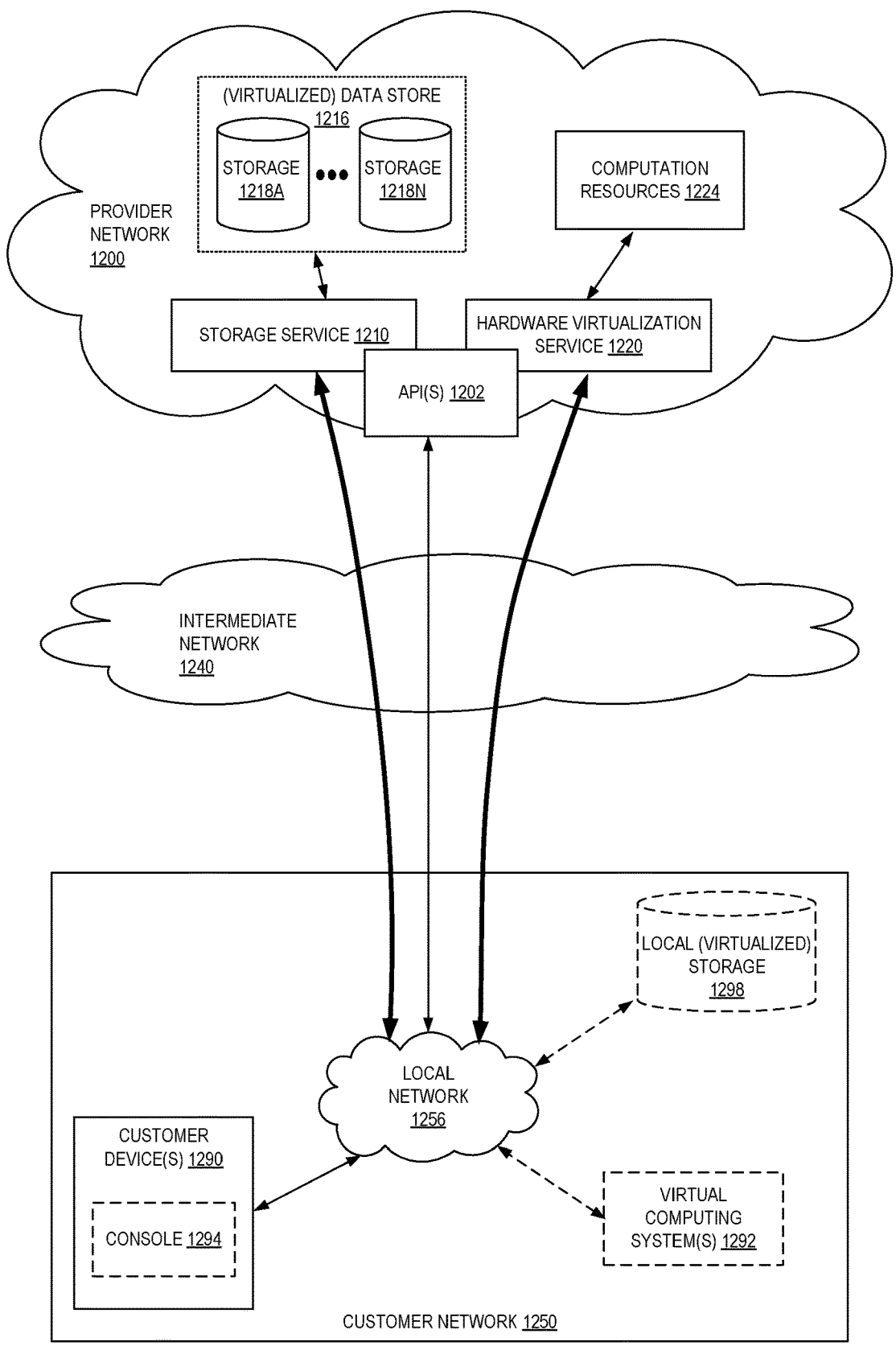
FIG. 12 is a block diagram of an example provider network that provides a storage service and a hardware virtualization service to customers according to some embodiments.

FIG. 12 is a block diagram of an example provider network that provides a storage service and a hardware virtualization service to customers, according to some embodiments. Hardware virtualization service 1220 provides multiple computation resources 1224 (e.g., VMs) to customers. The computation resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the computation resources 1224 to public Internet destinations, and from public Internet sources to the local IP addresses of computation resources 1224.

Provider network 1200 may provide a customer network 1250, for example coupled to intermediate network 1240 via local network 1256, the ability to implement virtual computing systems 1292 via hardware virtualization service 1220 coupled to intermediate network 1240 and to provider network 1200. In some embodiments, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some embodiments, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage service 1210, for example via one or more APIs 1202, to access data from and store data to storage resources 1218A-1218N of a virtual data store 1216 (e.g., a folder or "bucket", a virtualized volume, a database, etc.) provided by the provider network 1200. In some embodiments, a virtualized data store gateway (not shown) may be provided at the customer network 1250 that may locally cache at least some data, for example frequently-accessed or critical data, and that may communicate with storage service 1210 via one or more communications channels to upload new or modified data from a local cache so that the primary store of data (virtualized data store 1216) is maintained. In some embodiments, a user, via a virtual computing system 1292 and/or on another customer device 1290, may mount and access virtual data store 1216 volumes via storage service 1210 acting as a storage virtualization service, and these volumes may appear to the user as local (virtualized) storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Illustrative System

Figure 13:
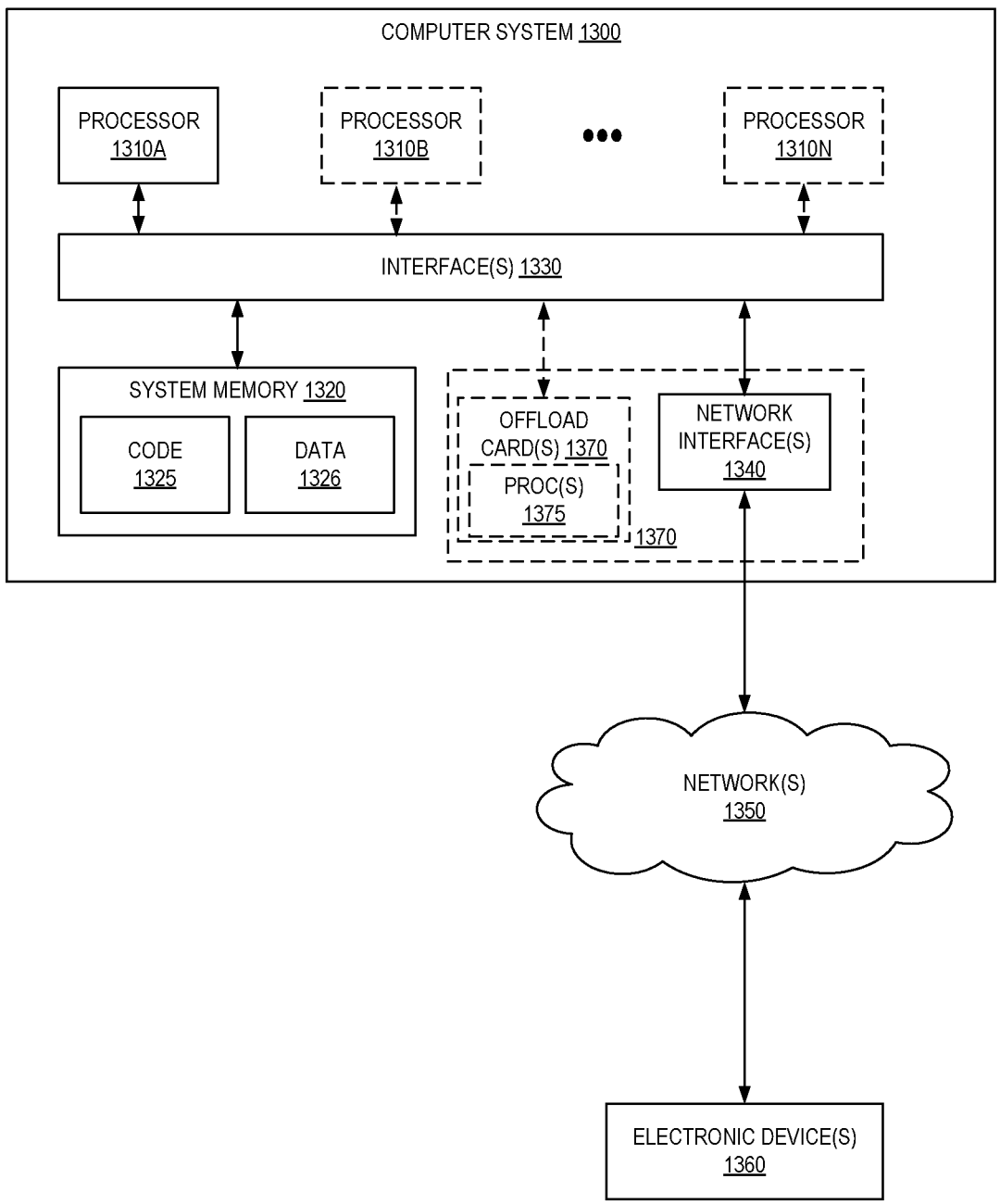
FIG. 13 is a block diagram illustrating an example computer system that may be used in some embodiments.

In some embodiments, a system that implements a portion or all of the techniques for hybrid teleconferencing as described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various embodiments a computer system 1300 may include one computing device or any number of computing devices configured to work together as a single computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various embodiments, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1320 as code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG. 1, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1300 includes one or more offload cards 1370 (including one or more processors 1375, and possibly including the one or more network interfaces 1340) that are connected using an I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute instances, and the one or more offload cards 1370 execute a virtualization manager that can manage compute instances that execute on the host electronic device. As an example, in some embodiments the offload card(s) 1370 can perform compute instance management operations such as pausing and/or un-pausing compute instances, launching and/or terminating compute instances, performing memory transfer/copying operations, etc. These management operations may, in some embodiments, be performed by the offload card(s) 1370 in coordination with a hypervisor (e.g., upon a request from a hypervisor) that is executed by the other processors 1310A-1310N of the computer system 1300. However, in some embodiments the virtualization manager implemented by the offload card(s) 1370 can accommodate requests from other entities (e.g., from compute instances themselves), and may not coordinate with (or service) any separate hypervisor.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Figure 14:
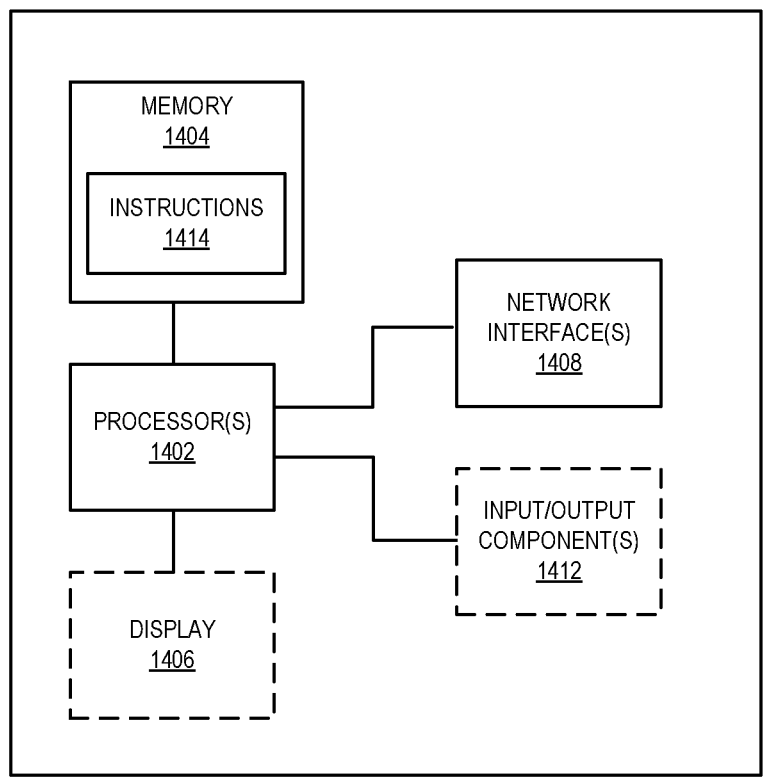
FIG. 14 illustrates a logical arrangement of a set of general components of an exemplary computing device that can be utilized in accordance with various embodiments.

FIG. 14 illustrates a logical arrangement of a set of general components of an example computing device 1400 such as user device 102, agent device 118, camera base 502 etc. Generally, a computing device 1400 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1402 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1404) to store code (e.g., instructions 1414) and/or data, and a set of one or more wired or wireless network interfaces 1408 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1404) of a given electronic device typically stores code (e.g., instructions 1414) for execution on the set of one or more processors 1402 of that electronic device. One or more parts of various embodiments may be implemented using different combinations of software, firmware, and/or hardware.

A computing device 1400 can include some type of display element 1406, such as a touch screen or liquid crystal display (LCD), although many devices such as portable media players might convey information via other means, such as through audio speakers, and other types of devices such as server end stations may not have a display element 1406 at all. As discussed, some computing devices used in some embodiments include at least one input and/or output component(s) 1412 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 15:
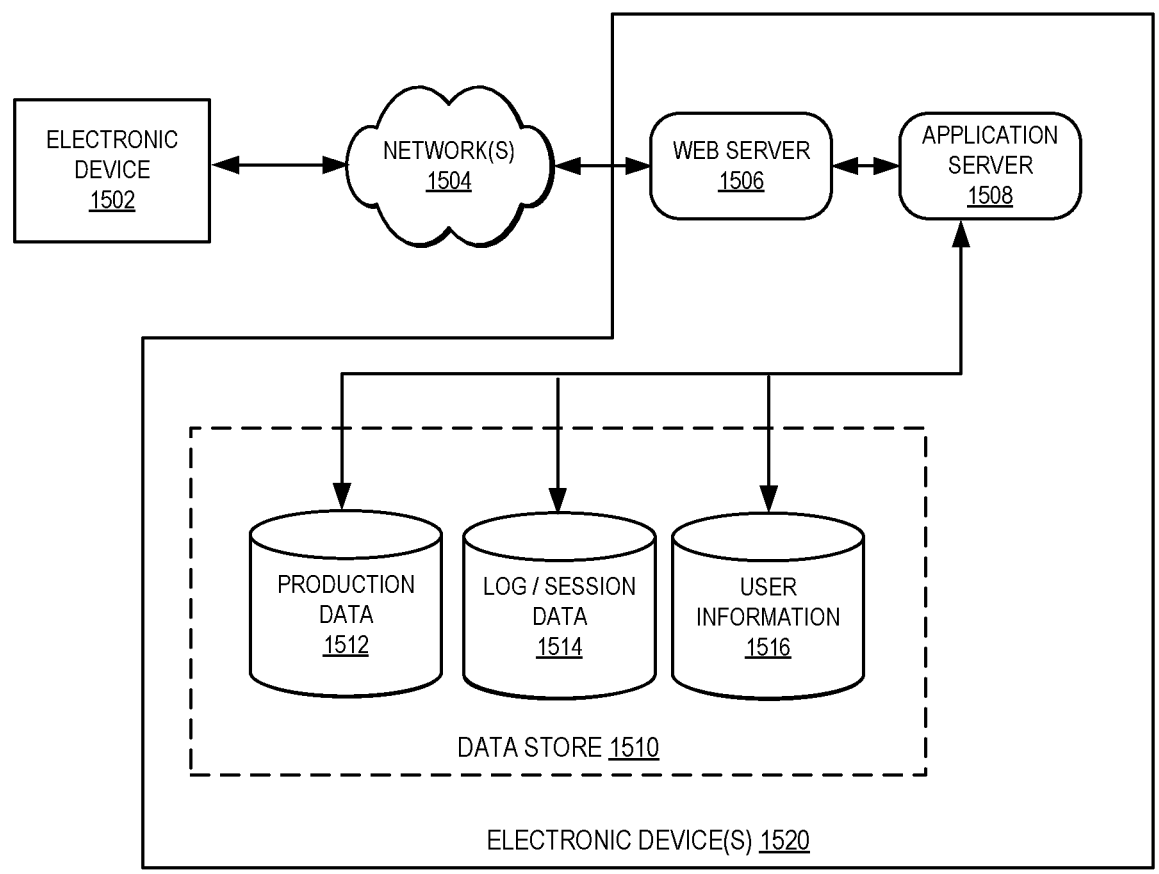
FIG. 15 illustrates an example of an environment for implementing aspects in accordance with various embodiments.

As discussed, different approaches can be implemented in various environments in accordance with the described embodiments. For example, FIG. 15 illustrates an example of an environment 1500 for implementing aspects in accordance with various embodiments. For example, in some embodiments call distribution service 110 and P2P contact service 122 may communicate using HyperText Transfer Protocol (HTTP) requests that are received by a web server (e.g., web server 1506), and the users, via electronic devices, may interact with the provider network via a web portal provided via the web server 1506 and application server 1508. As will be appreciated, although a web-based environment is used for purposes of explanation, different environments may be used, as appropriate, to implement various embodiments. The system includes an electronic client device 1502, which may also be referred to as a client device and can be any appropriate device operable to send and receive requests, messages or information over an appropriate network 1504 and convey information back to a user of the device 1502. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1504 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1504 includes the Internet, as the environment includes a web server 1506 for receiving requests and serving content in response thereto, although for other networks an alternative device serving a similar purpose could be used, as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device 1502 and handling a majority of the data access and business logic for an application. The application server 1508 provides access control services in cooperation with the data store 1510 and is able to generate content such as text, graphics, audio, video, etc., to be transferred to the client device 1502, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1502 and the application server 1508, can be handled by the web server 1506. It should be understood that the web server 1506 and application server 1508 are not required and are merely example components, as structured code discussed herein can be executed on any appropriate device or host machine as discussed elsewhere herein.

The data store 1510 can include several separate data tables, databases, or other data storage mechanisms and media for storing data relating to a particular aspect. For example, the data store illustrated includes mechanisms for storing production data 1512 and user information 1516, which can be used to serve content for the production side. The data store 1510 also is shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update, or otherwise process data in response thereto. In one example, a user might submit a search request for a certain type of item. In this case, the data store 1510 might access the user information 1516 to verify the identity of the user and can access a production data 1512 to obtain information about items of that type. The information can then be returned to the user, such as in a listing of results on a web page that the user is able to view via a browser on the user device 1502. Information for a particular item of interest can be viewed in a dedicated page or window of the browser.

The web server 1506, application server 1508, and/or data store 1510 may be implemented by one or more electronic devices 1520, which can also be referred to as electronic server devices or server end stations, and may or may not be located in different geographic locations. Each of the one or more electronic devices 1520 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the environment 1500 in FIG. 15 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used, and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 104A, 104B, 106A, 106B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving a request to initiate a call with a provider from a user device;
    authenticating the request based on credentials provided with the request;
    providing connection data to the user device and an agent device associated with the provider;
    providing first and second encryption keys to the user device and the agent device;
    establishing a first connection between the agent device and the user device using the connection data via a call routing service, wherein the first connection is encrypted using the first encryption keys; and
    establishing a second connection between the agent device and the user device using the connection data via a peer-to-peer (P2P) contact service, wherein the second connection is encrypted using the second encryption keys.

2. The computer-implemented method of claim 1, further comprising:
    generating captions in real-time for audio data obtained from the first connection using automatic speech recognition.

3. The computer-implemented method of claim 2, further comprising:
    translating the audio data from a first language to a second language prior to generating the captions.

4. The computer-implemented method of claim 1, wherein providing connection data to the user device and an agent device associated with the provider, further comprises:
    providing an identifier associated with the user device to the agent device, the identifier used to obtain endpoint data to establish the second connection.

5. The computer-implemented method of claim 1, further comprising:
    sending, by the user device, image data from the user device to the agent device over the second connection.

6. The computer-implemented method of claim 1, wherein the P2P contact service includes P2P media relay servers and P2P signaling servers maintained in separate private networks.

7. The computer-implemented method of claim 1, further comprising:
    obtaining a user profile associated with a user of the user device; and
    identifying a provider associated with the agent device based on the user profile.

8. The computer-implemented method of claim 1, further comprising:
    prior to establishing the first connection or the second connection, providing an estimated wait time to the user device.

9. The computer-implemented method of claim 1, wherein the first connection is an audio connection and wherein the second connection is a media connection.

10. The computer-implemented method of claim 9, wherein the connection data includes first endpoint data used to open the audio connection and a contact identifier used to obtain second endpoint data to open the media connection.

11. A system comprising:
    a telemedicine service implemented by a first one or more electronic devices, the telemedicine service including instructions that upon execution cause the telemedicine service to:
        receive a request to initiate a call with a provider from a user device;
        authenticate the request based on credentials provided with the request;
        provide connection data to the user device and an agent device associated with the provider;

provide first and second encryption keys to the user device and the agent device;

establish a first connection between the agent device and the user device using the connection data via a call routing service, wherein the first connection is encrypted using the first encryption keys; and establish a second connection between the agent device and the user device using the connection data via a peer-to-peer (P2P) contact service, wherein the second connection is encrypted using the second encryption keys.

12. The system of claim 11, wherein the instructions, when executed, further cause the telemedicine service to:
generate captions in real-time for audio data obtained from the first connection using automatic speech recognition.

13. The system of claim 12, wherein the instructions, when executed, further cause the telemedicine service to:
translate the audio data from a first language to a second language prior to generating the captions.

14. The system of claim 11, wherein the instructions to provide connection data to the user device and an agent device associated with the provider, when executed, further cause the telemedicine service to:
provide an identifier associated with the user device to the agent device, the identifier used to obtain endpoint data to establish the second connection.

15. The system of claim 11, wherein the instructions, when executed, further cause the telemedicine service to:
send, by the user device, image data from the user device to the agent device over the second connection.

16. The system of claim 11, wherein the P2P contact service includes P2P media relay servers and P2P signaling servers maintained in separate private networks.

17. The system of claim 11, wherein the instructions, when executed, further cause the telemedicine service to:
obtain a user profile associated with a user of the user device; and
identify a provider associated with the agent device based on the user profile.

18. The system of claim 11, wherein the instructions, when executed, further cause the telemedicine service to:
prior to establishing the first connection or the second connection, provide an estimated wait time to the user device.

19. The system of claim 11, wherein the first connection is an audio connection and wherein the second connection is a media connection.

20. The system of claim 19, wherein the connection data includes first endpoint data used to open the audio connection and a contact identifier used to obtain second endpoint data to open the media connection.

* * * * *